US010588045B2

(12) United States Patent
Krendzel et al.

(10) Patent No.: US 10,588,045 B2
(45) Date of Patent: Mar. 10, 2020

(54) METHOD AND APPARATUS FOR HANDLING DATA FLOW IN WIRELESS COMMUNICATION NETWORKS

(71) Applicant: Huawei Technologies Co., Ltd., Shenzhen (CN)

(72) Inventors: Andrey Krendzel, Helsinki (FI); Philip Ginzboorg, Helsinki (FI); Henrik Lundqvist, Kista (SE); Kari Heiska, Helsinki (FI)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/843,905

(22) Filed: Dec. 15, 2017

(65) Prior Publication Data

US 2018/0109973 A1   Apr. 19, 2018

Related U.S. Application Data

(63) Continuation of application No. PCT/EP2015/063615, filed on Jun. 17, 2015.

(51) Int. Cl.
*H04W 28/02* (2009.01)
*H04L 12/721* (2013.01)
(Continued)

(52) U.S. Cl.
CPC ......... *H04W 28/0268* (2013.01); *H04L 45/38* (2013.01); *H04L 45/42* (2013.01); *H04W 84/042* (2013.01)

(58) Field of Classification Search
CPC ............ H04W 28/0268; H04W 84/042; H04L 45/38; H04L 45/42
See application file for complete search history.

(56) References Cited

U.S. PATENT DOCUMENTS

2004/0172467 A1\* 9/2004 Wechter ................. H04L 41/12
709/224
2006/0281460 A1   12/2006 De Juan Huarte
(Continued)

FOREIGN PATENT DOCUMENTS

CN       1881942 A     12/2006
CN     103731901 A      4/2014
(Continued)

OTHER PUBLICATIONS

"OpenFlow Switch Specification,Version 1.1.0 Implemented (Wire Protocol 0x02)", ONF TS-002 (Open Networking Foundation), OpenFlow (Feb. 28, 2011).
(Continued)

*Primary Examiner* — Michael Thier
*Assistant Examiner* — Brian P Cox
(74) *Attorney, Agent, or Firm* — Leydig, Voit & Mayer, Ltd.

(57) ABSTRACT

A flow controller for controlling a data flow through a mobile communication network includes a processor configured to receive a request from a network entity, the request indicating interfaces of the network entity and a data flow destination, and determine at least one interface and a path from a data flow policy of the mobile communication network. The processor is also configured to send a reply to the network entity, the reply indicating at least one of the interfaces of the network entity to be used for the data flow and the path to be used for the data flow.

15 Claims, 13 Drawing Sheets

(51) Int. Cl.
*H04L 12/717* (2013.01)
*H04W 84/04* (2009.01)

(56) References Cited

U.S. PATENT DOCUMENTS

| | | | |
|---|---|---|---|
| 2012/0099422 A1* | 4/2012 | Liu | H04L 12/185 |
| | | | 370/221 |
| 2012/0324272 A1* | 12/2012 | Iwasawa | H04B 10/07 |
| | | | 714/3 |
| 2013/0266017 A1 | 10/2013 | Akiyoshi | |
| 2014/0341199 A1 | 11/2014 | Jeon et al. | |
| 2015/0280927 A1 | 10/2015 | Liang et al. | |
| 2015/0312894 A1 | 10/2015 | Chen et al. | |
| 2016/0234099 A1* | 8/2016 | Jiao | H04L 45/02 |

FOREIGN PATENT DOCUMENTS

| | | |
|---|---|---|
| CN | 103906074 A | 7/2014 |
| CN | 104023335 A | 9/2014 |
| CN | 104582004 A | 4/2015 |
| EP | 2535816 A1 | 12/2012 |
| WO | 2012160465 A1 | 11/2012 |

OTHER PUBLICATIONS

Sharma et al.,"Enhancing Network Management Frameworks with SDN-like Control," 2013 IFIP/IEEE International Symposium on Integrated Network Management (IM 2013), XP055538046, pp. 688-691, Institute of Electrical and Electronics Engineers, New York, New York (2013).

* cited by examiner

Fig. 8A — Flow requires a specific QoS treatment (e.g. voice) ⇒ Use GTP tunneling for the flow (i.e., assign interface 1)

Fig. 8B — Flow does not require a specific QoS treatment (e.g. web browsing) and can be offloaded ⇒ Treat flow as best-effort traffic via nearest L-GW (i.e., assign interface 3)

Fig. 8C — Destination network is accessible via P-GW, S-GW is overloaded, flow is delay tolerant (e.g. non-conversational video) ⇒ Use source routing over alternative routing (i.e., assign interface 5)

Fig. 8D — Flow is established between neighboring end equipment devices ⇒ Arrange shortest (direct) path (not via P-GW) avoiding any inactive network entities on the path (if any) (i.e., assign interface 4)

US 10,588,045 B2

METHOD AND APPARATUS FOR HANDLING DATA FLOW IN WIRELESS COMMUNICATION NETWORKS

CROSS-REFERENCE TO RELATED APPLICATIONS

This application is a continuation of International Application No. PCT/EP2015/063615, filed on Jun. 17, 2015, the disclosure of which is hereby incorporated by reference in its entirety.

TECHNICAL FIELD

The aspects of the disclosure relate generally to wireless communication systems and to handling data flow in wireless communication networks.

BACKGROUND

To support an ever increasing demand for higher data rates, multiple-access networks are being deployed based on a variety of transmission techniques based on present standards and new standards including Long Term Evolution (LTE), LTE-Advanced (LTE-A), and new versions of the 802.11 and 802.16 family of wireless broadband standards. As illustrated in FIG. 1, a current mobile network 100 may be designed as a hierarchical system where there are many-to-one relationships between base stations 105, referred to as Evolved Node Bs (eNBs) and a Serving Gateway, Mobility Management Entity combination (S-GW/MME) 110. There is typically a one-to-one relationship between the S-GW/MME 110 and a Packet Data Network Gateway (P-GW) 115 to one or more external packet data networks (PDNs) 120.

Upon attachment, the system creates a state in all the elements that form the predefined user-plane path towards the P-GW 115 to ensure appropriate data forwarding. These virtual connections are defined as bearers, which are then used to apply appropriate Quality of Service (QoS) and security requirements to data flows among the network elements.

In an uplink from a user equipment device (UE) 125 to the base station 105, the mapping between a data flow and a bearer is done at the UE 125, and the external packet information, for example, an external destination IP address, is not used in routing decisions until the packets are decapsulated at the P-GW 115. The procedure is the same with downlink data flows from the base station 105 to the UE 125. Thus, even though the data flows may belong to different bearers, all data flows follow the same data path between the UE 125, the base station 105, the S-GW 110, and the P-GW 115 to and from the PDNs 120.

As least one problem arises from the fact that the hierarchical structure of the user plane and the virtual connections between the UE 125 and the P-GW 115 do not allow flexible data flow handling through the operator network 130. For instance, mobile data offloading techniques Local IP Access (LIPA) and Selected IP Traffic Offload (SIPTO) developed by 3GPP are based on a per PDN-connection basis. To handle these techniques, a UE 125 supports more than one PDN connection, at least one to the P-GW 115 and one to the S-GW 110. As a result, data flows between PDN connections or data flows that do not use the P-GW 115 or the S-GW 110 are not supported.

It would be advantageous to provide a data flow solution for present carrier networks, which may have rigid topologies based on bearers, and for future carrier networks, which may have arbitrary topologies for data path formation.

SUMMARY

It is an object of the embodiments of the present disclosure to provide methods and apparatus for providing flexible data flow paths for data packets through a communication network.

According to a first aspect of the disclosure the above and further objects and advantages are obtained by a flow controller for controlling a data flow through a mobile communication network. The flow controller includes a processor configured to receive a request from at least network entity, the request indicating interfaces of the at least one network entity and a data flow destination. The processor is also configured to determine at least one interface and a path from a data flow policy of the mobile communication network, and send a reply to the at least one network entity, the reply including at least one of the interfaces of the at least one network entity to be used for the data flow and a path for the data flow, the at least one interface and the path determined from a data flow policy of the mobile communication network. The interface and the path provide an efficient route for the data flow through the mobile communication network.

In an implementation form of the flow controller according to the first aspect, the processor is configured to receive the data flow policy from a data flow policy control module via a communication path. This operation provides the flow controller with up to date data flow policy information.

In a second possible implementation form of the first possible implementation form of the flow controller according to the first aspect, the received data flow policy includes a quality of service (QoS) required for the data flow. Using a data flow policy that includes a required QoS ensures that the data flow routing provides the proper service requirements.

In a third possible implementation form of the flow controller according to the first aspect, the received data flow policy includes a priority for the data flow. Using a data flow policy that includes a priority ensures that the data flow routing is prioritized with respect to other data flows.

In a fourth possible implementation form of the flow controller according to the first aspect, the data flow policy provides a direct path between user equipment devices of the mobile communication network. The direct path reduces the number of entities the data flow traverses.

In a fifth possible implementation form of the flow controller according to the first aspect, the processor is configured to determine the at least one interface and the path from information in the network entity request, the received data flow policy and state information of the mobile communication network by determining other network entities coupled to the interfaces of the requesting network entity, determining whether the other coupled network entities are active or idle, and selecting an interface and path to the data flow destination that provides the required QoS. Determining the at least one interface and the path from the information provides for effective data flow routing.

In a sixth possible implementation form of the flow controller according to the first aspect, the processor is configured to receive the mobile communication network state information from a management and monitoring control via a communication path. This operation provides the flow controller with up to date data network state information.

In a seventh possible implementation form of the flow controller according to the first aspect, the state information of the mobile communication network indicates a number of idle network entities that may be activated to provide a portion of the path for the data flow, wherein the processor is configured to determine the path such that at least a portion of the data flow is routed along network entities being indicated as idle in the state information. Utilizing idle network entities provides for an efficient use of network resources.

In an eighth possible implementation form of the flow controller according to the first aspect, the state information of the mobile communication network indicates a number of active network entities that may be made idle. Thus, underutilized network entities may be made idle to conserve network resources.

In a ninth possible implementation form of the flow controller according to the first aspect, the request from the at least one network entity further comprises interfaces of at least one other network entity. The interfaces may be used to determine an optimized data flow path.

In a tenth possible implementation form of the flow controller according to the first aspect, the request comprises a utilization level of the network entity interfaces to be used for determining the selected interface and path meeting the required QoS for the data flow. The utilization level provides additional data for selecting interfaces for the data flow path.

In an eleventh possible implementation form of the flow controller according to the first aspect, the utilization level may comprise a number of data flows through the network entity interfaces. The number of data flows provides further additional data for selecting interfaces for the data flow path.

In a twelfth possible implementation form of the flow controller according to the first aspect, the request may comprise a number of user equipment devices providing data flows to the network entity. The number of user devices provides accuracy in determining the loading of the network entity.

In a thirteenth possible implementation form of the flow controller according to the first aspect, the at least one network entity comprises a plurality of network entities, and the processor is configured to receive data the flow policy from a data flow policy control module of the mobile communication network and to receive network state information from a management and monitoring control module of the mobile communication network. The processor is also configured to determine flow context information for routing data among the plurality of network entities and send the flow context information to the plurality of network entities in the mobile communication network. Determining and sending the flow context information to the network entities allows for efficient data flow routing among the network entities.

In a fourteenth possible implementation form of the flow controller according to the first aspect, the flow controller includes a memory for storing data flow paths among the plurality of network entities and the flow controller is configured to send updated flow context information to the plurality of network entities upon a change of one or more data flow paths. Sending the updated flow context information upon a change of the one or more data flow paths allows for efficient distribution of the updated flow context information among the network entities.

According to a second aspect of the disclosure, the above and further objects and advantages are obtained by a method in a flow controller for providing a flexible data flow in a mobile communication network. The method includes receiving a request including interfaces of at least one network entity and a data flow destination. The method also includes sending a reply including at least one of the interfaces to be used for the data flow and a path for the data flow, where the at least one interface and the path are determined from a data flow policy of the mobile communication network. Sending the reply with the at least one interface and the path provides an efficient route for transporting the data flow through the mobile communication network.

In an implementation form of the method according to the second aspect, the at least one network entity comprises a plurality of network entities and the method includes receiving the mobile communication network data flow policy information of the mobile communication network and receiving network state information of the mobile communication network. The method also includes determining flow context information for routing data among the plurality of network entities in the mobile communication network and sending the flow context information to the plurality of network entities in the mobile communication network. Sending the flow context information to the plurality of network entities allows for efficient data flow routing among the network entities.

In an implementation form of the flow controller according to the second aspect, a computer program product includes non-transitory computer program instructions that when executed by a processor cause the processor to perform the method according to the second aspect. Using a processor to perform the method provides an automated implementation of the disclosed embodiments.

The disclosed embodiments allow for a migration from a rigid, hierarchical PDN-oriented network to a data flow based granularity within the network allowing for flexible data flows among network entities. The disclosed embodiments also provide for improved user plane delay, load balancing among network entities, traffic offloading, and scalability to accommodate increases in the amount of data within the network.

The disclosed embodiments further provide a smooth migration path for existing network infrastructures to structures and techniques that support flexible distribution of data flows through various network interfaces or paths toward destination entities within and outside of the network.

These and other aspects, implementation forms, and advantages of the exemplary embodiments will become apparent from the embodiments described herein considered in conjunction with the accompanying drawings. It is to be understood, however, that the description and drawings are designed solely for purposes of illustration and not as a definition of the limits of the disclosed disclosure. Additional aspects and advantages of the disclosure will be set forth in the description that follows, and in part will be apparent from the description, or may be learned by practice of the disclosure. Moreover, aspects and advantages of the disclosure may be realized and obtained by means of the instrumentalities and combinations particularly pointed out in the appended claims.

BRIEF DESCRIPTION OF THE DRAWINGS

In the following detailed portion of the present disclosure, the disclosure will be explained in more detail with reference to the example embodiments shown in the drawings, in which

FIGS. 8A-8D illustrate exemplary processes for determining a flow path;

DETAILED DESCRIPTION OF THE DISCLOSED EMBODIMENTS

Figure 1:
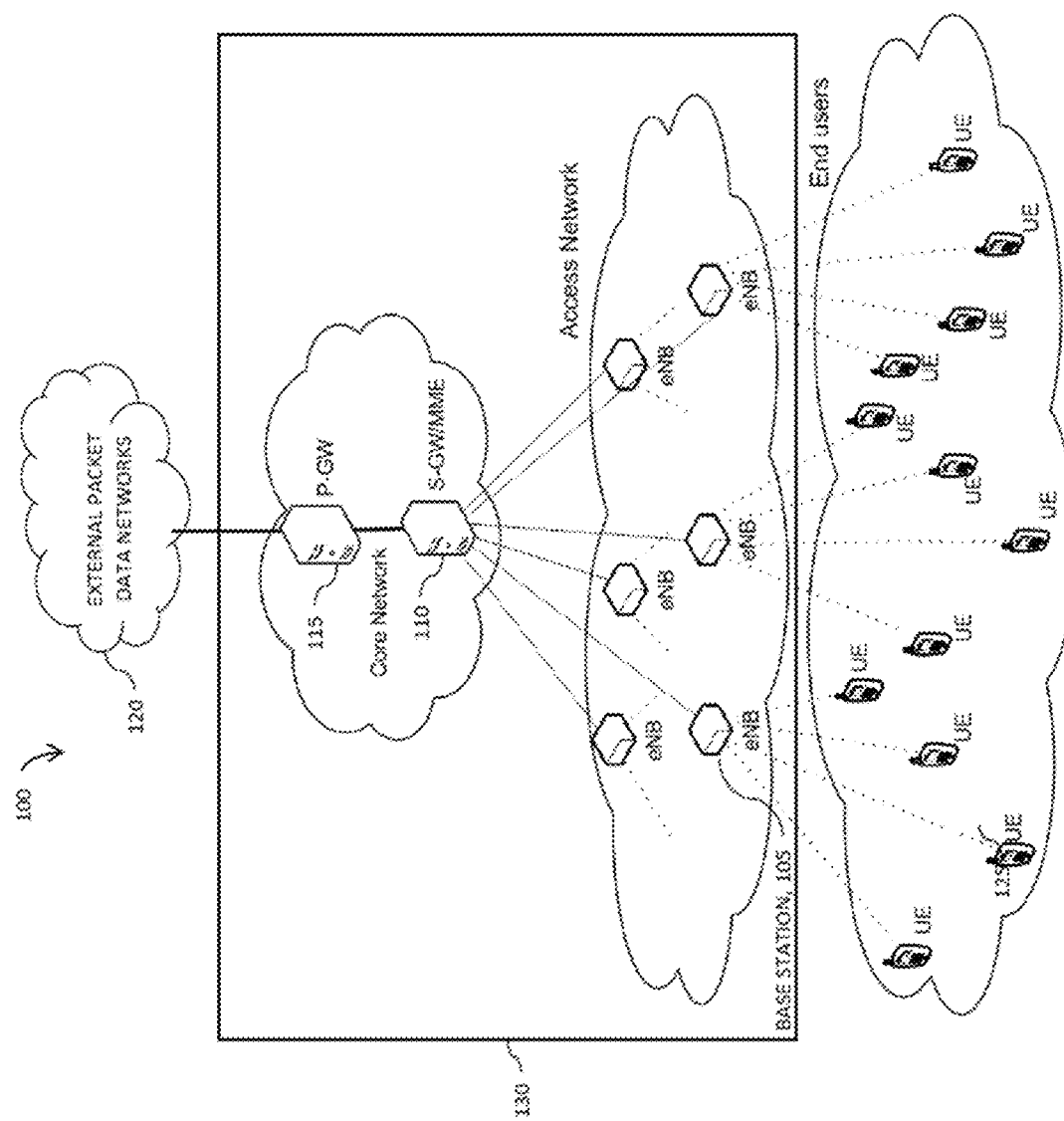
FIG. 1 illustrates an exemplary conventional mobile network.
Figure 2:
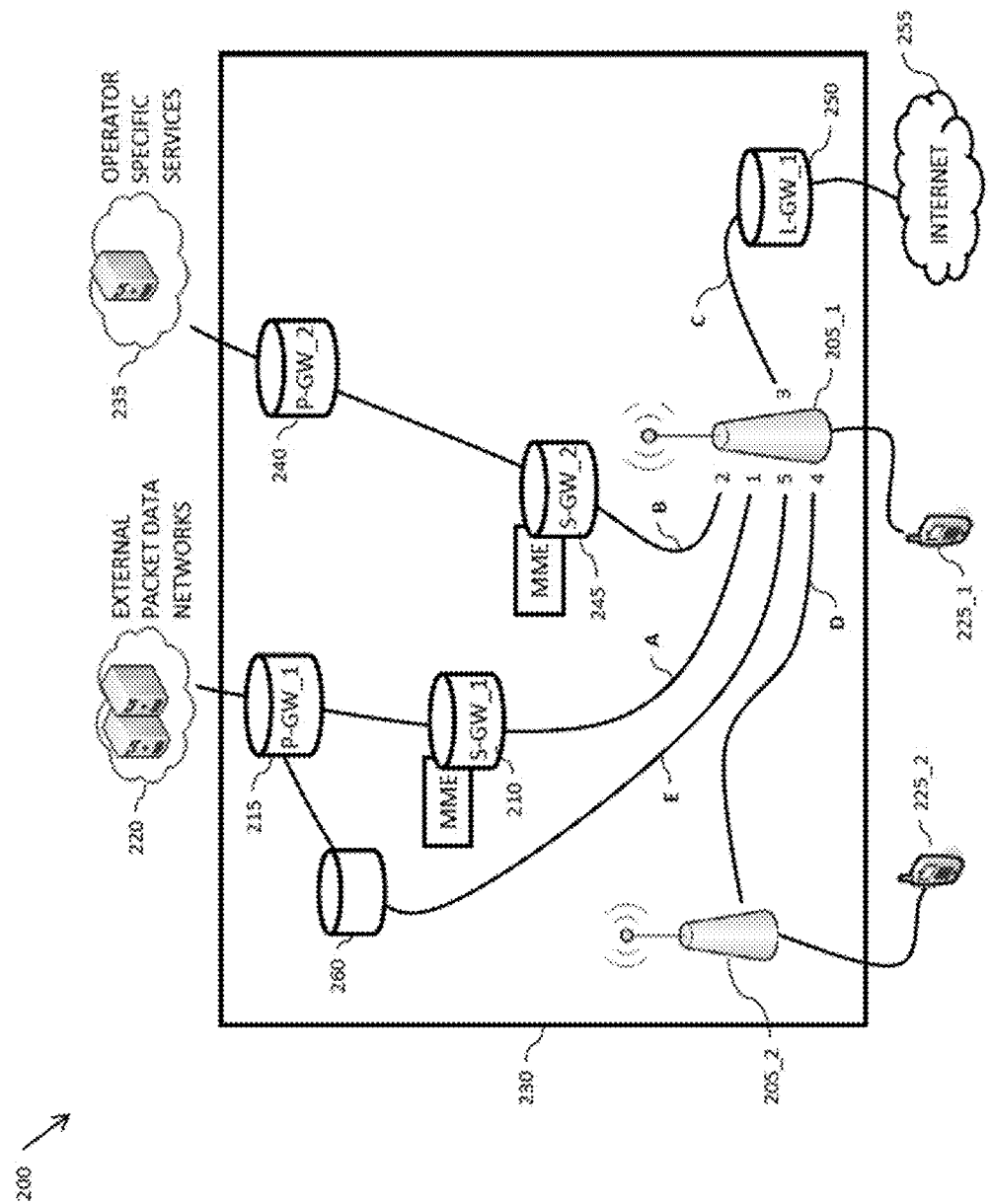
FIG. 2 shows a mobile network for implementing a scheme for flexible handling of multiple data flows.

FIG. 2 shows an exemplary mobile network 200 for illustrating the concept of flexible handling of multiple data flows through an operator network 230. As disclosed herein, a base station refers to equipment that facilitates wireless communication between user equipment devices and a mobile network, and includes access nodes (ANd) and evolved NodeBs (eNB) shown, for example, as base stations 205_1, 205_2. A user equipment device refers to a mobile phone, computer or any device connecting to an operator network through a base station, for example, user equipment devices 225_1, 225_2. A network entity refers to any entity within the operator network 230 that provides data forwarding including, without limitation, Packet Data Network Gateways P-GW_1 215, P-GW_2 240, Serving Gateways S-GW_1 210, S-GW_2 245, routers 260, Local Gateways L-GW_1 250, and base stations 205_1, 205_2.

Mobile network 200 generally includes an operator network 230 with connections to external packet data networks 220, operator specific services 235, at least one other network 255, and user equipment devices 225_1, 225_2. The operator network 230 may include one or more Packet Data Network Gateways P-GW_1 215, P-GW_2 240, and one or more Serving Gateways S-GW_1 210, S-GW_2 245, implemented in this embodiment as Serving Gateway, Mobility Management Entity combinations. It should be understood that the Serving Gateways may also be implemented without, or separate from, the Mobility Management Entities. The operator network may also include one or more routers 260, Local Gateways L-GW_1 250, and base stations 205_1, 205_2. As mentioned above, base stations 205_1, 205_2 may include ANds and eNBs.

As seen in FIG. 2, data flows may be routed through different interfaces 1, 2, 3, 4, 5 of the base station 205_1 and different paths A, B, C, D, E of the mobile network 230. For example, a data flow from UE 225_1 could travel from base station 205_1, through interface 1 and path A to S-GW_1 210, P-GW_1 215, and external packet data networks 220.

While the exemplary disclosed embodiments are described in terms of interfaces 1, 2, 3, 4, and 5 of base station 205_1, it should be understood that the disclosed embodiments include any interfaces of any network entity suitable for practicing the techniques or implementing the structures as disclosed herein.

If a specific service 235 is required that may only be provided through P-GW_2 240, the corresponding flow can be established through interface 2 of the base station 205_1 and path B to the S-GW_2 245 and to the P-GW_2 240 in order to have a shorter path. In contrast, data flows in conventional networks would typically be all routed through a common serving gateway.

The local gateway L-GW_1 250 may provide access to another network 255, for example, an IP network, the Internet or a corporate network may provide a more direct path C for a data flow between the UE 225_1 and the other network 255 via interface 3. The data flow may be effectively offloaded from the S-GW_1 210 or S-GW_2 245 and P-GW_1 115 or P-GW_2 240 decreasing the load at the operator network nodes, reducing the data path length and resulting in a decreased end-to-end delay.

If the two user equipment devices 225_1, 225_2 of the operator network 230 are communicating, a path D may be established directly between them through base station 205_2 using a data path via interface 4 and thus avoiding a path from UE 225_1 through P-GW_1 115 and back to UE 225_2.

As another example, if a data flow between the external packet data networks 220 and UE 225_1 via the P-GW_1 115 does not require the resources of the S-GW_1 210, the data flow may be routed by path E through router 260 or other suitable network entity using interface 5, for example, for load balancing purposes.

Thus, providing flexible data flows through different interfaces of one or more network entities within an operator network provides improvements in traffic offloading, load balancing, end to end delay, and network scalability.

Figure 3:
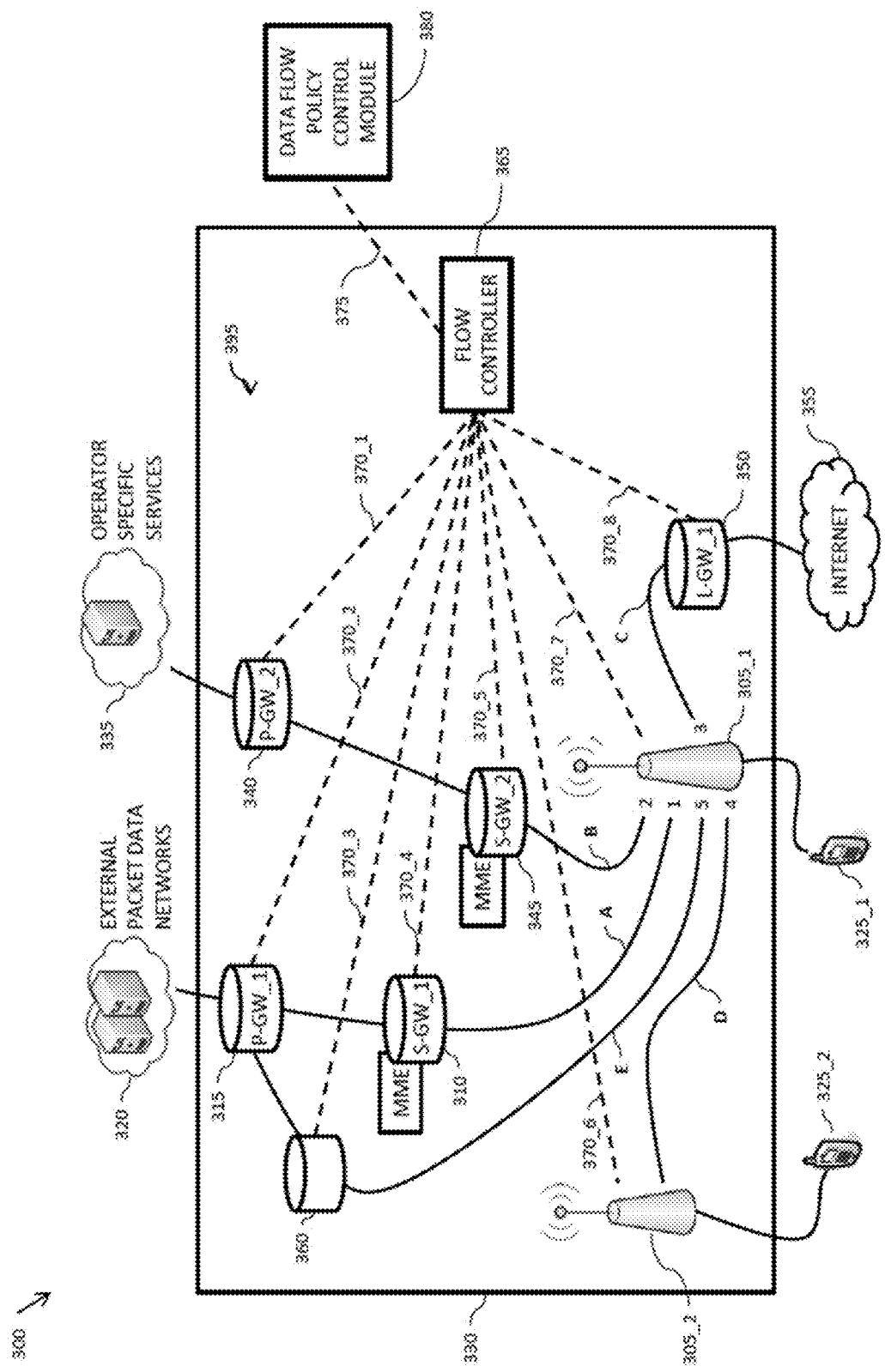
FIG. 3 illustrates a block diagram of a mobile network incorporating aspects of the disclosure.

FIG. 3 illustrates a block diagram of a mobile network 300 incorporating aspects of the present disclosure. Mobile network 300 comprises an operator network 330 with connections to external packet data networks 320, operator specific services 335, at least one other network 355, and user equipment deices 325_1, 325_2. The operator network 330 comprises network entities 395, including one or more Packet Data Network Gateways P-GW_1 315, P-GW_2 340, and one or more Serving Gateways S-GW_1 310, S-GW_2 345, implemented in this embodiment as Serving Gateway, Mobility Management Entity combinations. It should be understood that the Serving Gateways may also be implemented without, or separate from, the Mobility Management Entities. The network entities 395 may also include one or more routers 360, Local Gateways L-GW_1 350, and base stations 305_1, 305_2.

The operator network 330 also includes a flow controller 365 for allocating data flows to different paths via different interfaces of the network entities of the operator network 330. As shown in FIG. 3, the flow controller 365 has interfaces to communication paths 370_1-370_8 for communicating with the various network entities 395, P-GW_1 315, P-GW_2 340, S-GW_1 310, S-GW_2 345, routers 360, L-GW_1 350, and base stations 305_1, 305_2, in order to configure a data flow specific mapping among interfaces of the network entities. The flow controller also includes an interface to a communication path 375 for communicating with a data flow policy control module 380.

While the flow controller 365 is illustrated as having interfaces to communication paths 370_1-370_8 to each of the various network entities, it should be understood that some network entities may have no communication path to the flow controller 365. For example, if the flow controller is implemented in a Mobility Management Entity (MME) as described below with respect to FIG. 7, in some embodiments, the flow controller may not have an interface to P-GW_1 315, or L-GW_1 350.

Figure 4:
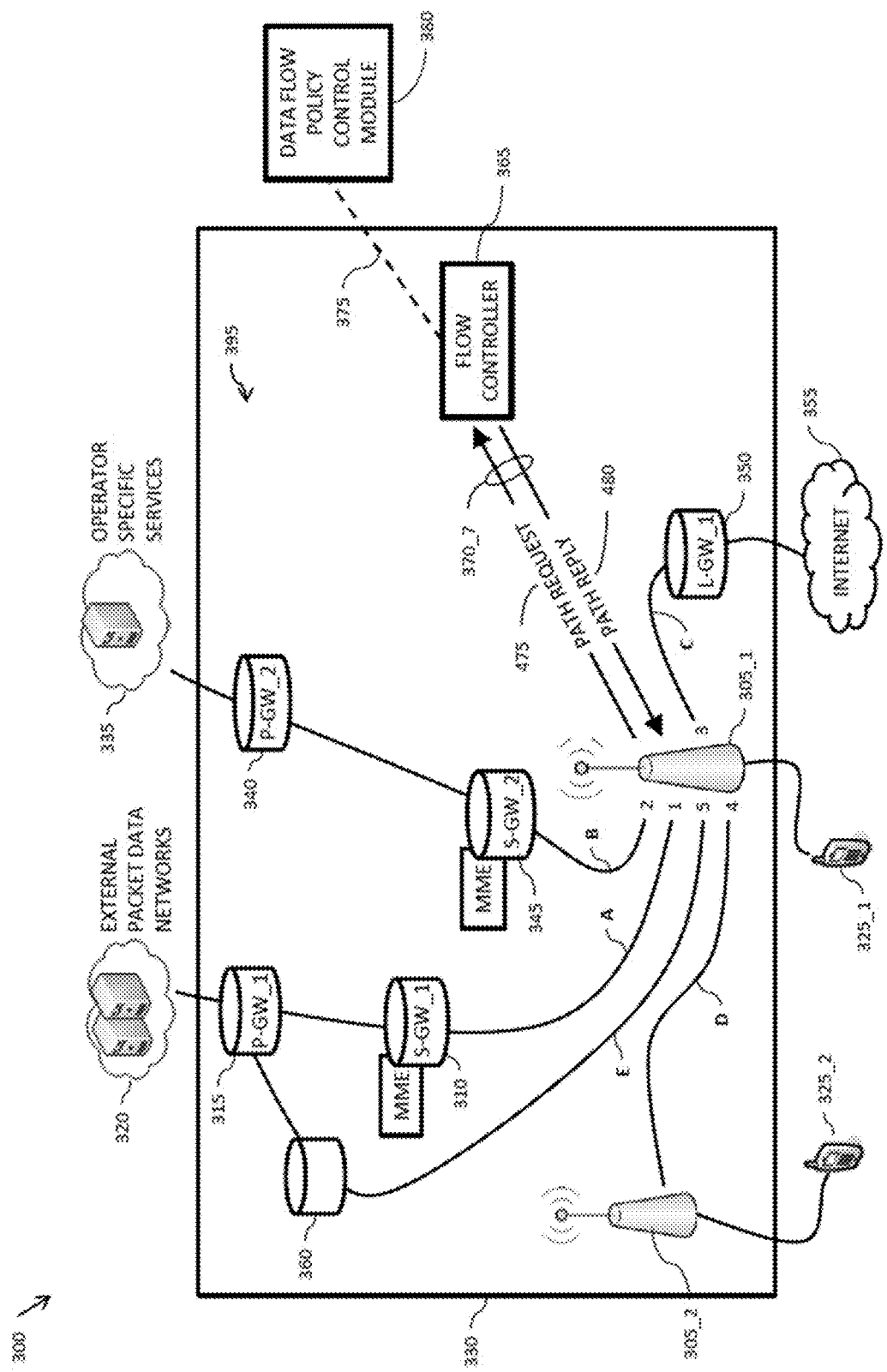
FIG. 4 shows an exemplary mobile network with a communication path between a network entity and a flow controller.

FIG. 4 shows an example of communication path 370_7 between a network entity 395, in this example, base station 305_1, and the flow controller 365. Communication between the network entities 395 and the flow controller 365 may generally be in the form of a path request 475 and a path reply 480. For example, base station 305_1 may initiate a path request 475 to the flow controller 365. The path request 475 may include interfaces 1, 2, 3, 4, 5 of the base station and a data flow destination. The path request 475 may also include information about the interfaces 1, 2, 3, 4, 5 for example, one or more of a current state of the interfaces, their availability, and a utilization level of the interfaces. In one aspect, the utilization level may include a number of flows through the interfaces. The path request 475 may also include information about interfaces of another network entity, which may be for example, connected to the present network entity. The path request 475 may further include additional information that may be used to assign an appropriate path for the data flow, for example, current state information of neighboring nodes in terms of traffic load, energy consumption, resource utilization, or other information about neighboring nodes. The flow controller 365 may store this information to build an up-to-date view of the state of the network entities 395, their interfaces, paths, and data flows through the operator network 330. The flow controller 365 may be configured to maintain and continuously update accurate information about the states of the network entities 395, the interfaces, paths and data flows. The path request 475 may also include a number of user equipment devices providing data flows to the particular network entity 395, and could also include a data flow identifier.

As mentioned above, the flow controller 365 may include an interface to a communication path 375 for communicating with the data flow policy control module 380. The data flow policy control module 380 supports operations related to data flow authorization, data flow prioritization, data flow QoS management, and managing data flow charges and generally determines data flow policies for the operator network based on these operations. In at least one implementation form, the data flow policy control module 380 may determine data flow policies based on a QoS level required for a particular data flow. In other implementation forms, the data flow policy control module 380 may determine data flow policies based on a load balancing scheme for other network entities coupled through one or more of the network entity interfaces. Data flow policies may also be determined based on efficient use of the network entities. For example, if the two user equipment devices 325_1, 325_2 are communicating with each other, a data flow policy could provide for a direct data flow bath between them through base stations 305_1 and 305_2. In further implementation forms, the data flow policy control module 380 may determine network data flow policies dynamically while managing the supported operations. The data flow policy control module 380 generally provides data related to the data flow policies and the supported operations to the flow controller 365 for use in selecting among the network entity interfaces.

In response to the path request 475, the flow controller 365 utilizes the information in the path request and the information provided by the data flow policy control module 380 to determine an interface of the network entity to be used for the data flow as well as path information towards a particular destination device, network entity or external network. The flow controller then initiates a path reply 480 that includes the interface of the network entity to be used along with the path information. Any other suitable information as determined from the procedures disclosed herein may also be included in the path reply.

Figure 5:
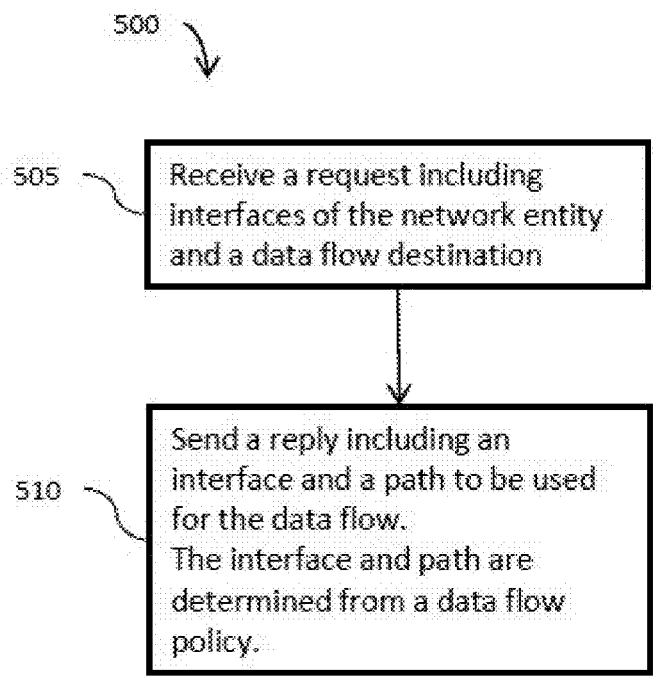
FIG. 5 shows a flow diagram for providing a flexible data flow a mobile communication network.

FIG. 5 shows a flow diagram 500 for providing a flexible data flow in the mobile communication network 300 of FIGS. 3 and 4. A step 505 comprises receiving a request from a network entity, the request including interfaces of the network entity and a data flow destination. A step 510 comprises sending a reply to the network entity, the reply including at least one of the interfaces of the network entity to be used for the data flow and a path for the data flow, the at least one interface and the path determined from a data flow policy of the mobile communication network.

Figure 6:
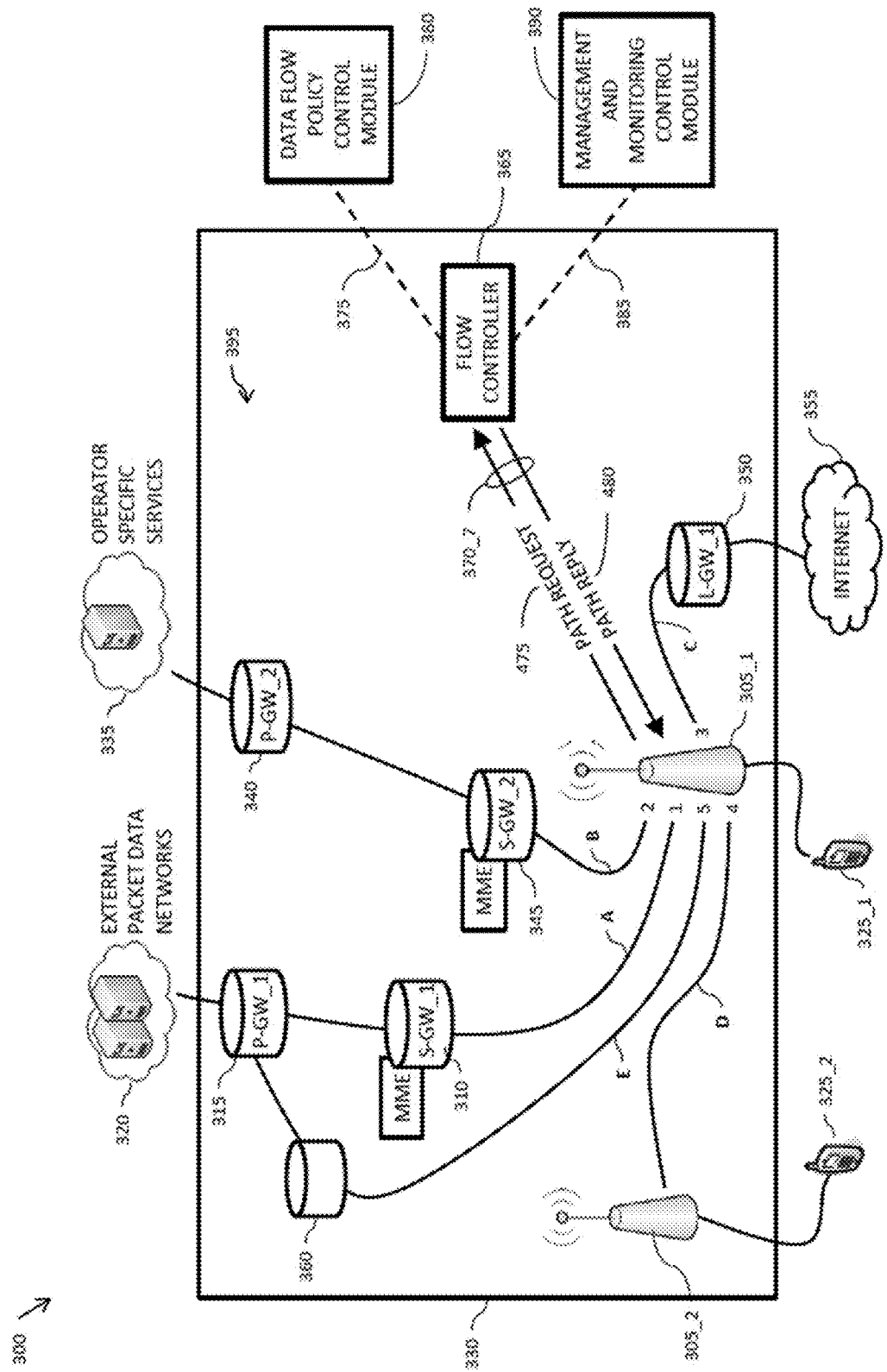
FIG. 6 shows a block diagram of another implementation of a mobile network.

FIG. 6 shows another implementation of operator network 330 where the flow controller 365 also includes an interface to a communication path 385 for communicating with a management and monitoring control module 390. The management and monitoring control module 390 generally monitors the operator network 330 and maintains information about the current state of the operator network 330. The information about the current state of the network may include an inventory of idle and active network entities. Any one of the base station 305_2, P-GW_1 315, P-GW_2 340, S-GW_1 310, S-GW_2 345, routers 360, and L-GW_1 350 may be activated or made idle depending on the requirements of the network 330. The management and monitoring control module 390 may maintain data related to idle network entities and may provide information related to those idle network entities that may be activated to provide a portion of a data flow path, for example, for load balancing or to provide resources for maintaining a QoS. The management and monitoring control module 390 may also maintain data related to active network entities and may provide information related to those active network entities that may be made idle because of low usage, such that the flow controller may stop assigning flows through the network entities to be made idle. As a result, the flow controller 365 is provided with information from the path request, the data flow policy control module 380, and the management and monitoring control module 390 which may be used to determine a data flow path among the network entities. For example, the flow controller 365 may determine which other network entities are coupled to the interfaces of the network entity initiating the path request, a quality of service required for the data flow, and the active or idle state of the coupled other entities, in order to determine the interface of the network entity to be used for the data flow as well as the path information.

In response to the path request 475, the flow controller 365 may optionally respond with a query for more detailed information before sending the path reply 480. For example, the path request may include a load indication for each interface of the requesting network entity, and the flow controller 365 request information about transmission or reception rates per data flow or class. As a result, the flow controller 365 can make further decisions about re-optimization of the routing of data flows based on the additional information if needed.

Different routing schemes may be applied to the various data flows based on the interface and path specified by the flow controller 365. For example, if the path reply includes specific network entities for a data flow, e.g. for offloading or load balancing purposes, source routing can be used. As another example, if the path reply includes only an IP address of a gateway to an external network (e.g. the L-GW address) and a source interface, non-source routing may be used, based on the packet's final destination, to treat the data flow as best-effort traffic through the assigned interface. In some implementation forms, the data flows may be assigned to predetermined paths configured, e.g. using Multi/Protocol Label Switching (MPLS). One benefit of including the network entity interface in the path reply is that the flow controller 365 has the ability to configure a data flow specific mapping between the interface and the path depending on the current state of the network, where the state of the network entity interfaces varies dynamically. In another implementation form, a network entity interface may specify a particular routing. For example, a network entity interface to a S-GW may explicitly indicate that a data flow is to be treated as it is now in 3GPP networks (General Packet Radio Service Tunneling Protocol (GTP) tunneling) and may trigger established 3GPP procedures related to bearer establishment, activation, and modification.

Figure 7:
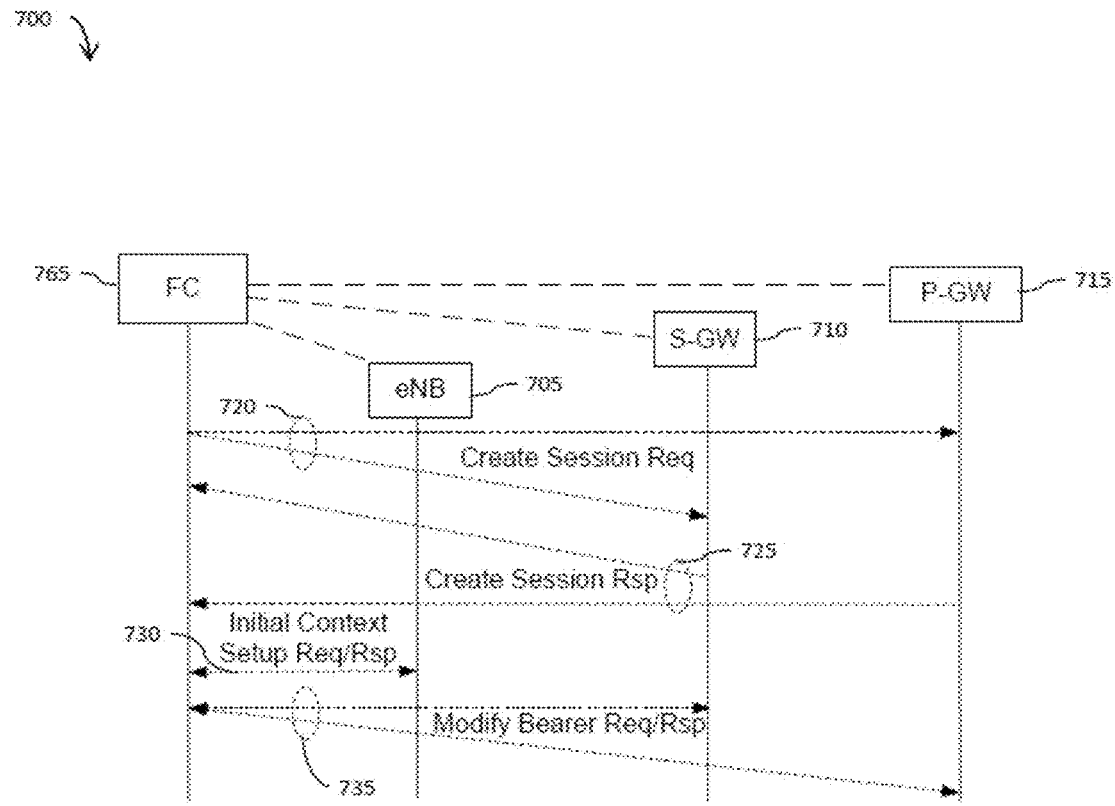
FIG. 7 illustrates a simplified example of a bearer establishment procedure performed by the flow controller.

FIG. 7 illustrates a simplified example of a bearer establishment procedure 700 when a flow controller 765 is realized in a Mobility Management Entity (MME) as shown in FIGS. 2 through 4 and 6. In this example, a data flow is being established between a base station, shown as eNB 705, and P-GW 715 through S-GW 710. The flow controller 765 initiates a session request 720 to both the S-GW 710 and the P-GW 715. The S-GW 710 and the P-GW 715 reply with a session response 725. The flow controller 765 exchanges an initial context setup request and response 730 with the eNB 705, and exchanges requests and responses 735 to modify the bearer with the S-GW 710 and the P-GW 715.

Some examples illustrating processes for determining a flow path from the information from the path request, the data flow policy control module 380, and the management and monitoring control module 390 are shown in FIGS. 8A-8D.

Referring to FIG. 8A, upon analyzing the information from the path request, the data flow policy control module 380, and the management and monitoring control module 390, the flow controller 365 determines that a data flow requires a specific QoS and determines that interface 1 and GTP will be used for the data flow.

As shown in FIG. 8B, upon analyzing the information from the path request, the data flow policy control module 380, and the management and monitoring control module 390, the flow controller 365 determines that a data flow does not requires a specific QoS and can be offloaded. As a result, the flow controller determines that interface 3 and a best-effort treatment through the nearest L-GW will be used for the data flow.

FIG. 8C illustrates an example, where upon analyzing the information from the path request, the data flow policy control module 380, and the management and monitoring control module 390, the flow controller 365 determines that a destination network is accessible via the P-GW, the S-GW is overloaded, and that the data flow is delay tolerant. As a result, the flow controller 365 determines that interface 3 and source routing will be used for the data flow.

In FIG. 8D, the flow controller 365 has determined, upon analyzing the information from the path request, the data flow policy control module 380, and the management and monitoring control module 390, that a flow is being established between neighboring end equipment devices. As a result, the flow controller 365 determines that interface 4 will be used and arranges the shortest direct path (not via the P-GW) avoiding any idle network entities.

Figure 9:
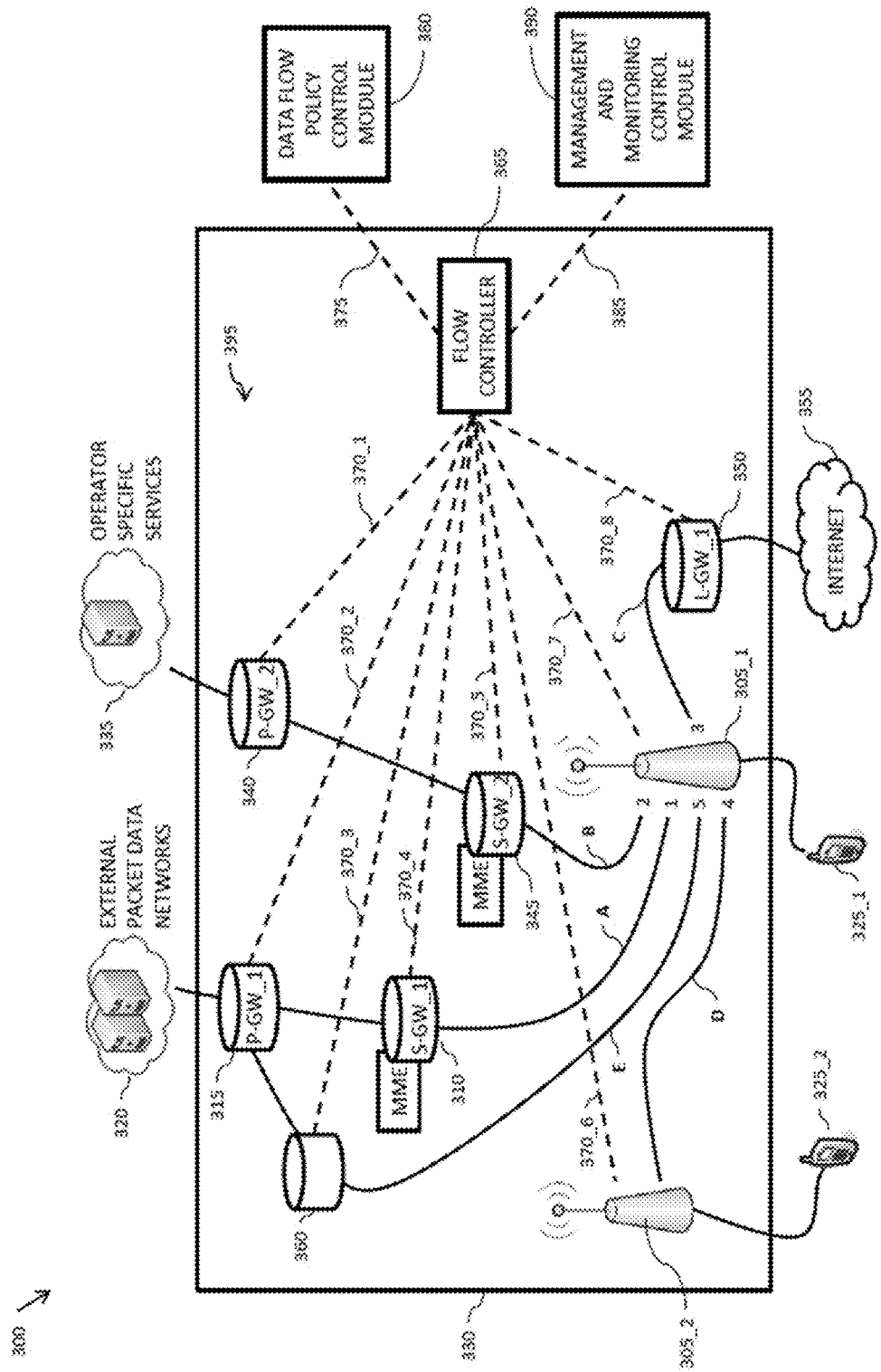
FIG. 9 shows an exemplary mobile network with a communication path between the flow controller and a management and monitoring control module.

FIG. 9 shows operator network 330 where the flow controller has an interface to a communication path 385 to the management and monitoring control module 390, in addition to interfaces to communication paths 370_1-370_8 for communicating with the various network entities P-GW_1 315, P-GW_2 340, S-GW_1 310, S-GW_2 345, routers 360, L-GW_1 350, and base stations 305_1, 305_2, for configuring data flow specific mappings among the interfaces of the network entities. The flow controller 365 may also send updated flow-context information to one or more of the network entities for handling and routing data flows through the operator network 330. Flow context information may include interfaces to be used, a routing path, specific routing procedures for particular interfaces, routing tables for specific network entities, traffic filters, data flow lifetime, data flow priority, binding ID for mobility service, and other information for routing information through the operator network 330.

For example, the flow controller 365 may store and maintain a mapping of data flow paths among the network entities. The flow controller 365 may receive mobile communication network data flow policy information from the data flow policy control module 380 and may receive mobile communication network state information from the management and monitoring control module 390. The flow controller 365 operates to process the data flow policy information and the network state information to determine flow context information for routing data among the network entities in the mobile communication network. The flow controller 365 sends the flow context information to one or more of the network entities in the mobile communication network. If data flows change, for example, because of network topology changes or load optimization schemes, the flow controller 365 may send updated flow context information for the data flows that need remapping and could also update other network entities. In at least one possible implementation form, the network entities store the flow context information for use in routing data flows.

It should be understood that in some embodiments, the flow controller may only send the flow context information to a subset of the network entities. For example, in certain implementations, the flow controller may only send the flow context information to those network entities that may require the flow context information. In other exemplary implementations, the flow context information may only be sent to the P-GW_1 315 and the user equipment devices user equipment devices 325_1, 325_2.

Figure 10:
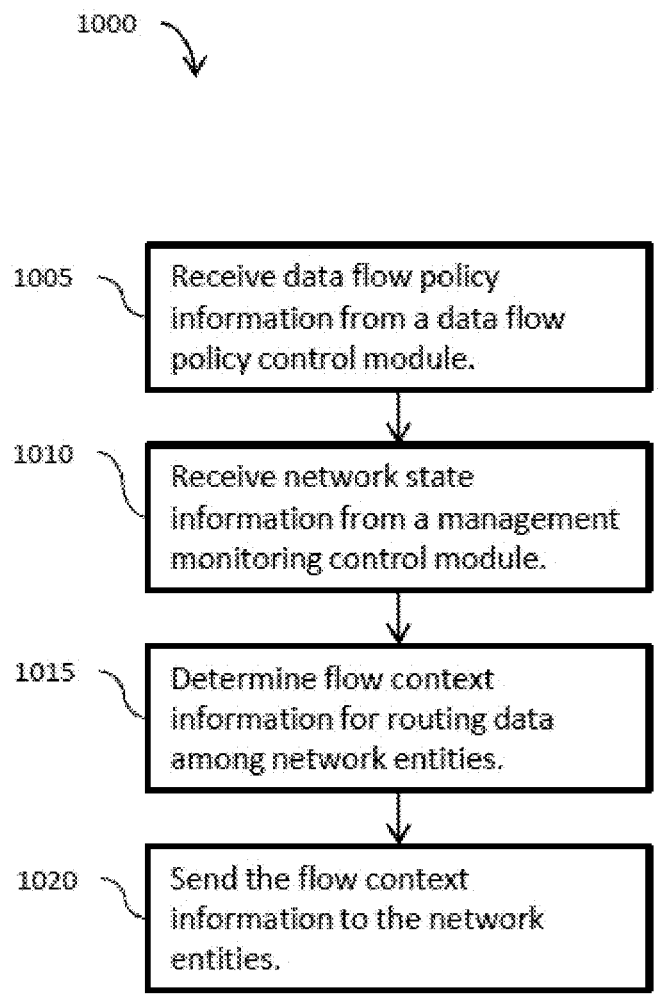
FIG. 10 shows a flow diagram for providing a flexible data flow.

FIG. 10 shows a flow diagram 1000 for providing a flexible data flow as described with respect to FIG. 9. A step 1005 comprises receiving data flow policy information from a data flow policy control module of the mobile communication network. A step 1010 includes receiving network state information from a management and monitoring control module of the mobile communication network. A step 1015 comprises determining flow context information for routing data among network entities in the mobile communication network. A step 1020 includes sending the flow context information to the network entities in the mobile communication network.

Figure 11:
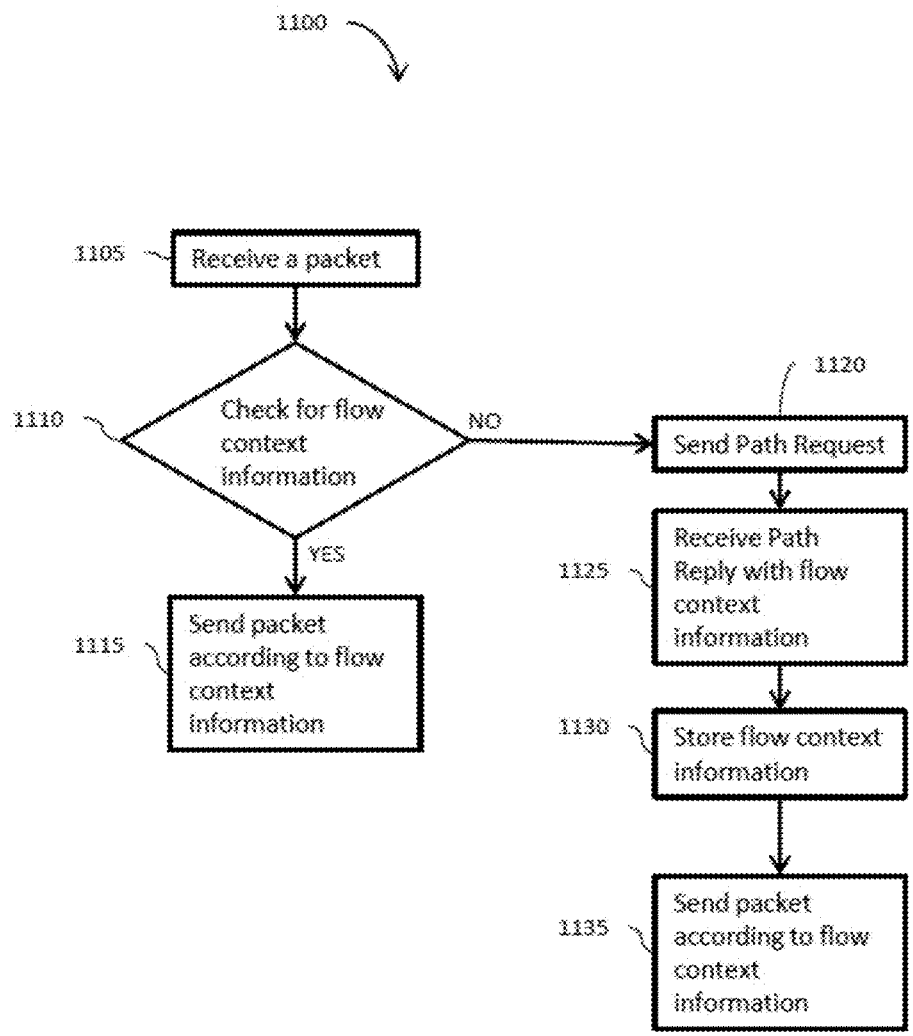
FIG. 11 shows a flow diagram for operating a network entity.

In other examples relating to FIG. 6, the network entity, for example base station 305_1 may store the flow context information and only send a path request 475 when there is no flow context information specified for an incoming packet. FIG. 11 shows a flow diagram 1100 for operating a network entity in this manner. In step 1105 a packet is received, and in step 1110, the network entity checks to see if flow context information is available for the packet. If flow context information is available, the packet is sent according to the flow context information as shown in step 1115. If no flow context information is available, the network entity sends a path request to the flow controller as shown in step 1120. As shown in step 1125, the network entity receives a path reply including the flow context information. As shown in step 1130, the network entity stores the flow context information and as shown in step 1135, sends the packet according to the flow context information.

Figure 12:
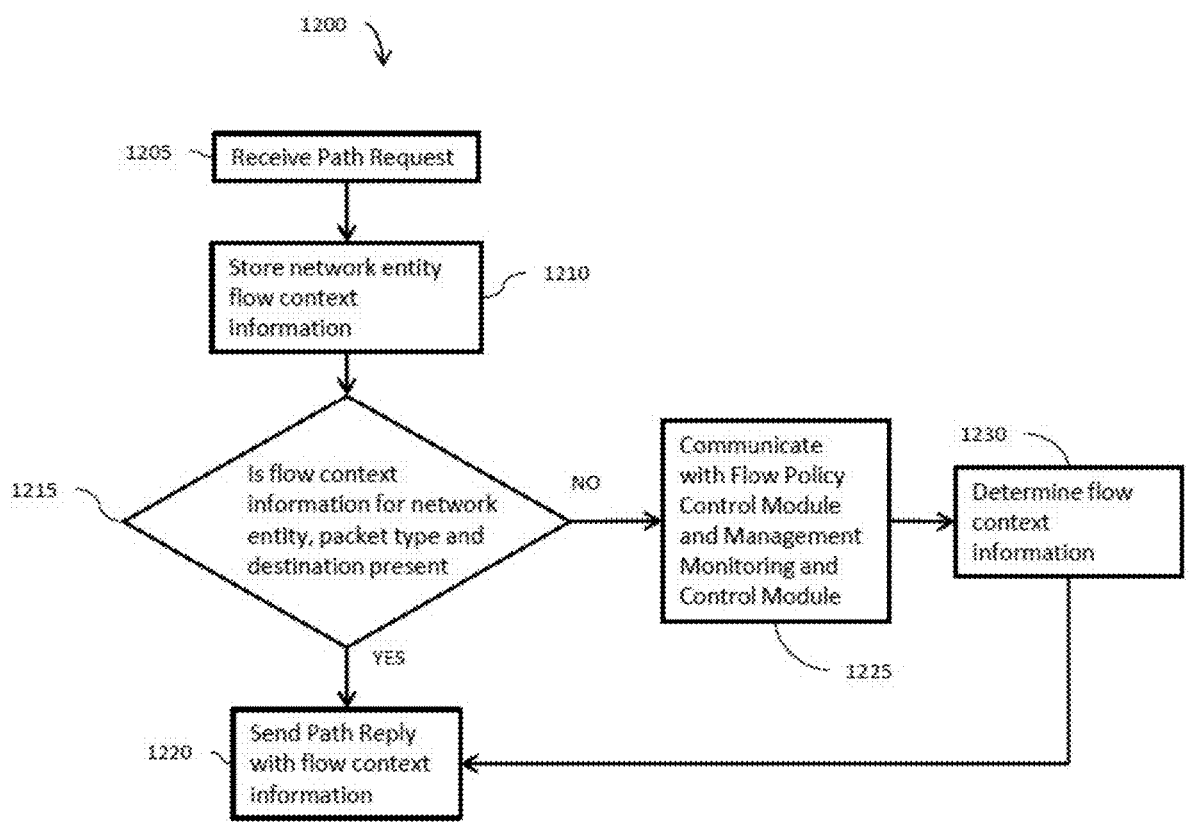
FIG. 12 shows a flow diagram for operating the flow controller.

In a further implementation shown in FIG. 6, the flow controller 365 may store flow context information and only request information from the data flow policy and management and monitoring control modules 380, 390 when there is no flow context information specified for the requesting network entity with respect to the incoming packet. FIG. 12 shows a flow diagram 1200 for operating the flow controller 365 in this manner. In step 1205 a path request 475 is received by the flow controller 365. In step 1210, the flow controller 365 determines if flow context information for the network entity, packet type and destination are present. If so, the flow controller 365 sends a path reply 480 with the flow context information to the network entity as shown in step 1220. As shown in step 1225_1, if the flow context information for the network entity, packet type and destination are not present, the flow controller communicates with the data flow policy and management and monitoring control modules 380, 390, and as shown in step 1230 determines the flow context information and proceeds to send a path reply 480 with the flow context information to the network entity as shown in step 1220.

Figure 13:
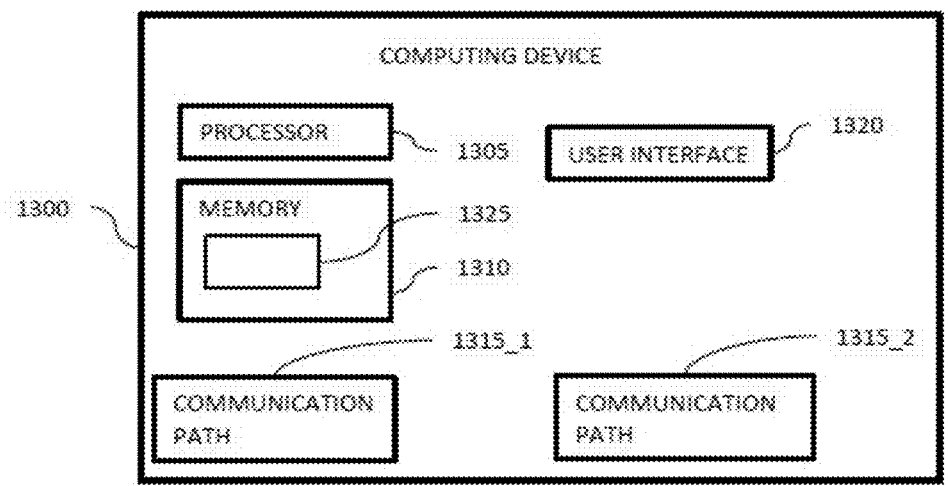
FIG. 13 illustrates a block diagram of a flow controller incorporating aspects of the disclosed embodiments.

FIG. 13 illustrates a block diagram of the flow controller 365. The flow controller 365 includes a processor 1305 coupled to a memory 1310, one or more network communication paths or interfaces 1315_1, 1315_2 and an optional user interface 1320. The processor 1305 may be a single processing device or may comprise a plurality of processing devices including special purpose devices such as for example it may include digital signal processing (DSP) devices, microprocessors, or other specialized processing devices as well as one or more general purpose computer processors. The processor is configured to perform the above mentioned flow control processes. The memory 1310 may be implemented as a computer program product and may include one or more of various types of volatile or non-volatile computer memory such as for example read only memory (ROM), random access memory (RAM), magnetic or optical disk, or other types of computer memory. The memory 1310 stores computer program instructions 1325 that may be accessed and executed by the processor 1305 to cause the processor 1305 to perform a variety of desirable computer implemented processes or methods. In at least one embodiment, the computer program instructions are non-transitory. The program instructions 1325 stored in memory 1310 may be organized as groups or sets of program instructions referred to by those skilled in the art with various terms such as programs, software components, software modules, units, etc., where each program may be of a recognized type such as an operating system, an application, a device driver, or other conventionally recognized type of software component. Also included in the memory 1310 are program data and data files which are stored and processed by the computer program instructions.

The one or more communication paths or interfaces 1315_1, 1315_2 are configured to exchange communications with the various network entities disclosed above, including, without limitation, Packet Data Network Gateways P-GW_1 315, P-GW_2 340, Serving Gateways S-GW_1 310, S-GW_2 345, routers 360, Local Gateways L-GW_1 350, base stations 305_1, 305_2, the flow policy control module 380, and the management and monitoring control module 390.

The disclosure advantageously provides methods and apparatus for providing flexible data flow paths for data packets through a communication network. The disclosure also provides methods and apparatus for load balancing among network entities, activating network entities to provide increased or more efficient data flow, idling network entities to conserve energy, and generally provides the ability to exploit available paths through the network for traffic routing.

Thus, while there have been shown, described and pointed out, features of the disclosure as applied to the exemplary embodiments thereof, it will be understood that various omissions, substitutions and changes in the form and details of devices and methods illustrated, and in their operation, may be made by those skilled in the art without departing from the spirit and scope of the disclosure. Further, it is expressly intended that all combinations of those elements, which perform substantially the same function in substantially the same way to achieve the same results, are within the scope of the disclosure. Moreover, it should be recognized that structures and/or elements shown and/or described in connection with any disclosed form or embodiment of the disclosure may be incorporated in any other disclosed or described or suggested form or embodiment. It is the intention, therefore, to be limited only as indicated by the scope of the claims appended hereto.

What is claimed is:

1. A flow controller for controlling a data flow through a mobile communication network, the flow controller comprising:
 a memory having processor-executable instructions stored thereon; and
 a processor, configured to execute the processor-executable instructions to facilitate:
 receiving a request from at least one network entity, the request indicating interfaces of the at least one network entity and a data flow destination;
 determining at least one interface of the at least one network entity to be used for the data flow and a path to be used for the data flow based on a data flow policy and state information of the mobile communication network; and
 sending a reply to the at least one network entity, the reply indicating the at least one interface of the at least one network entity to be used for the data flow and the path to be used for the data flow;
 wherein the state information of the mobile communication network indicates at least one of: a number of idle network entities that may be activated to provide a portion of the path to be used for the data flow, or a number of active network entities that may be made idle;
 wherein determining the at least one interface of the at least one network entity to be used for the data flow and the path to be used for the data flow based on the data flow policy and the state information of the mobile communication network further comprises:
    determining other network entities coupled to interfaces of a requesting network entity;
    determining whether the other coupled network entities are active or idle; and
    selecting an interface and a path to the data flow destination that provides a required quality of service (QoS).

2. The flow controller of claim 1, wherein the processor is further configured to execute the processor-executable instructions to facilitate receiving the data flow policy from a data flow policy control module via a communication path.

3. The flow controller of claim 1, wherein the data flow policy includes a quality of service (QoS) required for the data flow.

4. The flow controller of claim 1, wherein the data flow policy includes a priority for the data flow.

5. The flow controller of claim 1, wherein the processor is further configured to execute the processor-executable instructions to facilitate receiving the state information of the mobile communication network from a management and monitoring control module (MMCM) via a communication path.

6. The flow controller of claim 1, wherein the processor is further configured to execute the processor-executable instructions to facilitate determining the path to be used for the data flow such that at least a portion of the data flow is routed along network entities being indicated as idle in the state information of the mobile communication network.

7. The flow controller of claim 1, wherein the request from the at least one network entity further indicates interfaces of at least one other network entity.

8. The flow controller of claim 1, wherein the request comprises a utilization level of network entity interfaces to be used for selecting the interface and path meeting the required quality of service (QoS).

9. The flow controller of claim 1, wherein the at least one network entity comprises a plurality of network entities, and wherein the processor is further configured to execute the processor-executable instructions to facilitate:
    receiving the data flow policy from a data flow policy control module (DFPCM) of the mobile communication network;
    receiving the state information of the mobile communication network from a management and monitoring control module (MMCM) of the mobile communication network;
    determining flow context information for routing data among the plurality of network entities in the mobile communication network; and
    sending the flow context information to the plurality of network entities in the mobile communication network.

10. The flow controller of claim 9, wherein the memory is further configured for storing data flow paths among the plurality of network entities;
    wherein the processor is further configured to execute the processor-executable instructions to facilitate sending updated flow context information to the plurality of network entities upon a change of one or more data flow paths.

11. A method for providing a data flow in a mobile communication network, the method comprising:
    receiving, by a flow controller, a request indicating interfaces of at least one network entity and a data flow destination;
    determining, by the flow controller, at least one interface of the at least one network entity to be used for the data flow and a path to be used for the data flow based on a data flow policy and state information of the mobile communication network; and
    sending, by the flow controller, a reply comprising the at least one interface of the at least one network entity to be used for the data flow and the path to be used for the data flow;
    wherein the state information of the mobile communication network indicates at least one of: a number of idle network entities that may be activated to provide a portion of the path to be used for the data flow, or a number of active network entities that may be made idle;
    wherein determining the at least one interface of the at least one network entity to be used for the data flow and the path to be used for the data flow based on the data flow policy and the state information of the mobile communication network further comprises:
        determining other network entities coupled to interfaces of a requesting network entity;
        determining whether the other coupled network entities are active or idle; and
        selecting an interface and a path to the data flow destination that provides a required quality of service (QoS).

12. The method of claim 11, wherein the at least one network entity comprises a plurality of network entities, and wherein the method further comprises:
    receiving the data flow policy of the mobile communication network;
    receiving the state information of the mobile communication network;
    determining flow context information for routing data among the plurality of network entities in the mobile communication network; and
    sending the flow context information to the plurality of network entities in the mobile communication network.

13. A mobile communication system, wherein the system comprises:
    at least one network entity; and
    a flow controller;
    wherein the at least one network entity is configured to send a request to the flow controller, the request indicating interfaces of the at least one network entity and a data flow destination;
    wherein the flow controller is configured to:
        determine at least one interface of the at least one network entity to be used for the data flow and a path to be used for the data flow based on a data flow policy and state information of the mobile communication network; and
        send a reply to the at least one network entity, the reply comprising the at least one interface of the at least one network entity to be used for the data flow and the path to be used for the data flow;
    wherein the state information of the mobile communication network indicates at least one of: a number of idle network entities that may be activated to provide a portion of the path to be used for the data flow, or a number of active network entities that may be made idle;
    wherein determining the at least one interface of the at least one network entity to be used for the data flow and the path to be used for the data flow based on the data flow policy and the state information of the mobile communication network further comprises:
  determining other network entities coupled to interfaces of the at least one network entity;
  determining whether the other coupled network entities are active or idle; and
  selecting an interface and a path to the data flow destination that provides a required quality of service (QoS).

14. A non-transitory computer-readable medium having processor-executable instructions stored thereon for providing a data flow in a mobile communication network, wherein the processor-executable instructions, when executed, facilitate performance of the following:
  receiving a request indicating interfaces of at least one network entity and a data flow destination;
  determining at least one interface of the at least one network entity to be used for the data flow and a path to be used for the data flow based on a data flow policy and state information of the mobile communication network; and
  sending a reply comprising the at least one interface of the at least one network entity to be used for the data flow and the path to be used for the data flow;
  wherein the state information of the mobile communication network indicates at least one of: a number of idle network entities that may be activated to provide a portion of the path to be used for the data flow, or a number of active network entities that may be made idle;
  wherein determining the at least one interface of the at least one network entity to be used for the data flow and the path to be used for the data flow based on the data flow policy and the state information of the mobile communication network further comprises:
    determining other network entities coupled to interfaces of a requesting network entity;
    determining whether the other coupled network entities are active or idle; and
    selecting an interface and a path to the data flow destination that provides a required quality of service (QoS).

15. The method according to claim 11, wherein the request is received from the at least one network entity; and wherein the reply is sent to the at least one network entity.

* * * * *